United States Patent [19]

Hirahara

[11] 4,214,013
[45] Jul. 22, 1980

[54] CONTINUOUS PRESSURE COOKING METHOD

[75] Inventor: Katsuji Hirahara, Santa Clara, Calif.

[73] Assignee: FMC Corporation, San Jose, Calif.

[21] Appl. No.: 17,628

[22] Filed: Mar. 5, 1979

Related U.S. Application Data

[62] Division of Ser. No. 804,115, Jun. 6, 1977.

[51] Int. Cl.² .............................................. A23L 3/22
[52] U.S. Cl. .................................. 426/629; 426/508; 426/509; 426/584; 426/534
[58] Field of Search ............... 426/615, 629, 630, 634, 426/508, 509, 589

[56] References Cited

U.S. PATENT DOCUMENTS

| Re. 26,474 | 10/1968 | Altman | 99/443 R |
| 1,581,934 | 4/1926 | Larsen | 426/510 |
| 2,057,366 | 10/1936 | Chapman | 99/404 |
| 3,386,833 | 6/1968 | Johnson | 426/629 X |

*Primary Examiner*—Arthur D. Kellogg
*Attorney, Agent, or Firm*—J. F. Verhoeven

[57] ABSTRACT

A continuous cooking or sterilizing process employs apparatus wherein particulate foods are cooked under pressure in and by the cooking sauce with which the food is eventually packed in containers. The sauce is externally heated in a heat exchanger to the sterilizing temperature, and the food and sauce are cooled under pressure by injecting cooled sterile sauce into the hot mixture of cooked product and sauce before the mixture is released to atmosphere. By cooking the product directly in the sauce, product flavor is enhanced and upon cooling, the absorbed sauce is cooled below the flash temperature preventing damage to the cellular portions of the food particles on pressure release. Thus during the canning operation, only a relatively short reheat of the sealed containers and possibly the product is necessary to resterilize the outer portions of the food particles, the cooking sauce, and the interior of the containers. Part of the cooking sauce which is discharged to atmosphere with the cooked product, is drained off, cooled and injected into the product at a rotary discharge valve, to bring the sauce temperature slightly below its flash temperature. In another embodiment, useful for processes wherein it is desirable or permissable for the canning sauce to be diluted, cool sterile water is injected into an empty pocket of the discharge valve for the pressure cooling step. In both cases, the product and cooking sauce is sufficiently cooled, by the time the filled valve pockets are discharged to atmosphere, that no detrimental flashing of the liquid sauces will occur.

8 Claims, 2 Drawing Figures

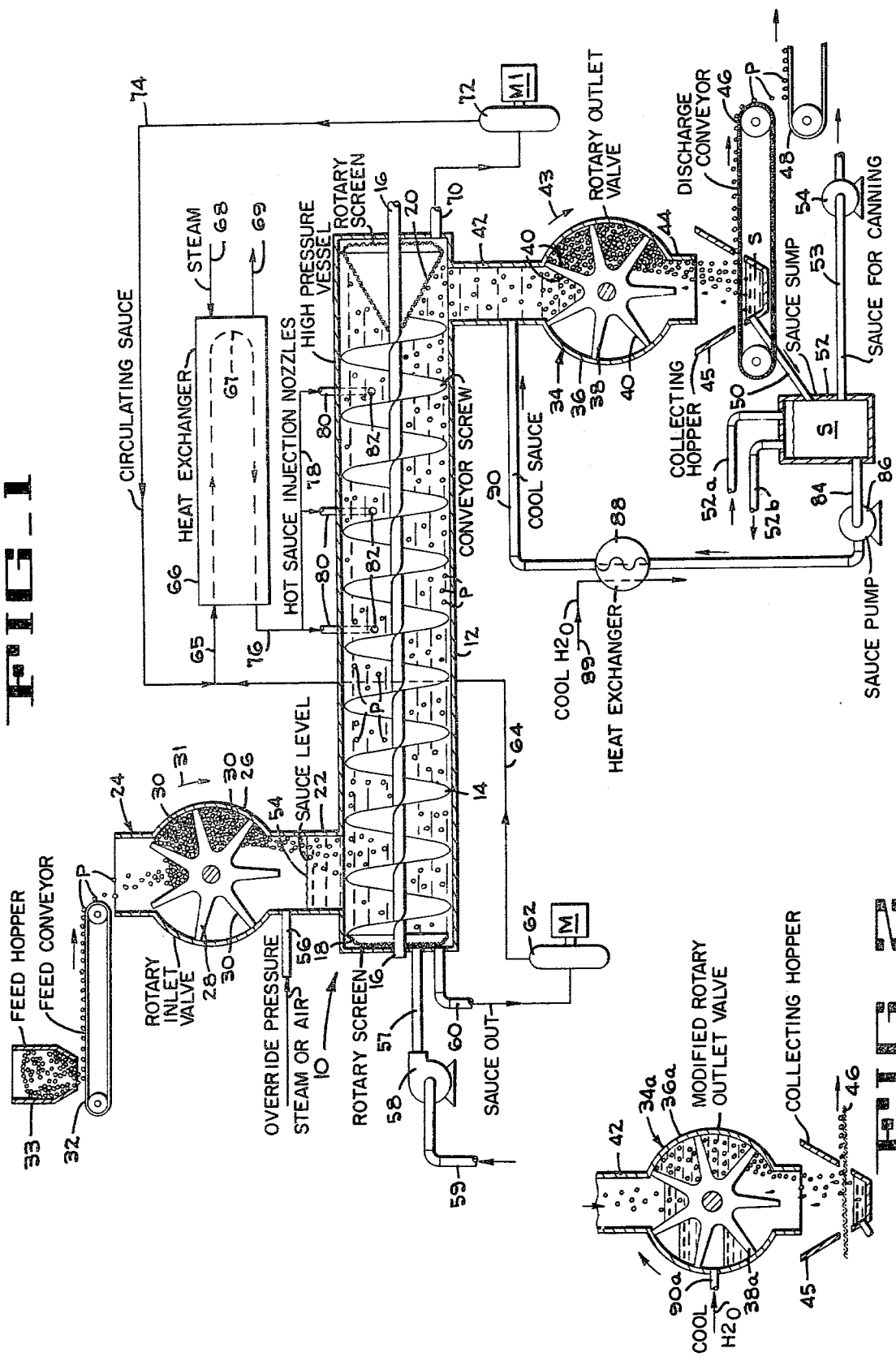

CONTINUOUS PRESSURE COOKING METHOD

This is a division of application Ser. No. 804,115 filed June 6, 1977.

FIELD OF THE INVENTION

The present invention relates to the continuous cooking and sterilizing of food products for commercial canning operations, before the products are sealed in containers. More particularly the invention relates to the cooking of particulate foods so that they retain their original shape after cooking. This objective can be achieved with conventional present day methods at slow processing rates, but is more difficult to accomplish at the ever increasing processing rates demanded by food processors.

DESCRIPTION OF PRIOR ART

High cooking or sterilizing temperatures are often employed to provide short processing times, and this requires the use of a pressure cooker, either of the retort type in which the cooking is done in batches, or in a continuous type with constant flow of the material to be cooked, and retort cookers are inherently limited in production capacity because of the time required to load and unload the retort. Continuous screw conveyor pressure cookers with inlet and outlet valves have been previously used for processing animal feed grains, such as milo, and have a higher production rate than retorts.

Conventional canning practice for many table foods is to cook the food in a steam environment, and to then can the food with added sauce, brine or syrup. A known process for canned baked beans includes the preliminary step of cooking (baking) the beans and sauce in an oven for seven hours in 600 pound batches prior to the canning step. In an effort to shorten this preliminary step in the process, it has been experimentally determined that cooking the beans, in sauce, in a retort for 20 minutes at 250° F. will shorten the oven residence time 43% to only three hours, but there still remains the disadvantages of loading and unloading the retort, batch by batch.

Particulate canned foods must retain their original discrete appearance and shape after cooking to be commercially acceptable. This requires that a continuous high output processing system for such foods must avoid the problem of "flashing". Flashing can result when a liquid-saturated food product at superatmospheric pressure and high temperature is suddenly released to atmosphere. The liquid, previously prevented from boiling by the pressure environment in the cooker, instantaneously boils or flashes at atmospheric pressure. Flashing can cause the entire particles of the product, or at least some part of each particle, to explode. Thus, to avoid flashing either a retort cooking process or a continuous pressure cooking process must include means for cooling the cooker particles of product below the atmospheric boiling point before the particles are released to atmosphere.

The Martin U.S. Pat. No. 3,041,185, issued June 26, 1962, discloses a complete sterilizing and aseptic canning system, and one object of the Martin patent is to prevent disintegration or mushing of the solid components in a food product.

The Martin patent points out the problems of conventional heat exchangers for rapidly heating foods for an aseptic canning process, wherein it is difficult to prevent scorching or "burn on" of the product, which inevitably occurs in high temperature, short time processes wherein the product is heated by conduction before the particulates are completely sterilized. Martin prevents burn on and flashing disintegration of the solids by flowing a layer of liquid and solid food mixture down a wall in a pressurized chamber 132 (FIG. 1A) while conventionally heating the mixture with a moving stream of superheated steam which sweeps the mixture under the action of a fan 135 in the chamber. A complex dual control system is provided so that just enough heat is imparted to the superheated steam to keep steam condensation and vaporization from the product in balance. It is stated that no intermixing of food and steam, or deleterious agitation of the food will occur. The Martin patent also discloses the necessity of cooling the product under pressure to prevent flashing, which can either excessively cool the product for the canning step, and/or cause particulate foods to disintegrate or explode. The system of Martin also requires controls metering the flow of both liquids and solids before they are mixed in the mixer D (FIG. 1A) for maintaining a set proportion of liquids to solids throughout the cooking process. This problem is inherent in the Martin process wherein the liquid and the solids are combined externally of the sterilizer to form a mixture, and the mixture is then introduced into the sterilizing system.

Other U.S. patents which disclose structural arrangements and processing methods of interest, are:

Baxter U.S. Pat. No. 959,448, May 31, 1910, shows a horizontally disposed screw conveyor type pressure cooker for corn, potted meats, etc. with a rotary product inlet valve, the steam being introduced at 15 psi. A solid stream of sterilized product flows through a water jacketed cooling pipe into previously sterilized cans. The mass of product in the cooled discharge pipe acts as a valve to retain steam under pressure in the cooker proper. A portion of the steam in the cooking chamber is recirculated back into the feed hopper above the inlet valve. The screw conveyor cooking chamber is only partially filled with product (e.g. corn) and no liquid is added to the product.

Larsen U.S. Pat. No. 1,581,934, Apr. 20, 1926, discloses a horizontally disposed rotary cooker drum with an integral conveyor helix and having rotary inlet and outlet valves. Hot water enters the inlet valve along with the product and steam is introduced into the rotating drum. The product flows along the bottom of the drum and is cooked in a stream of hot water flowing along the bottom, with steam filling the remainder of the drum. The rate of water feed is proportionate to the rate of product feed. The product is discharged through a water cooled dispensing pipe and the product in the pipe retains steam in the drum.

Hiller U.S. Pat. No. 1,735,392, Nov. 12, 1929, discloses a high temperature screw conveyor drum cooking apparatus for fish and vegetables, using superheated steam (230°-400° F.). The primary purpose is to minimize the presence of water and fix soluble food substances, such as albumin, by using a high heat so that the soluble substance will not go into solution as the cooking proceeds. Thus, the Hiller apparatus is particularly directed to a cooking process wherein the presence of water along with the product is to be avoided.

Wilbur U.S. Pat. No. 2,534,648, Dec. 19, 1950, is assigned to the FMC Corporation and discloses a horizontally oriented screw-type continuous pressure steamer for peeling vegetables such as potatoes, which are fed and discharged by rotary valves. The vegetable skins are loosened by steam at super-atmospheric pressure in the pressure steamer, and the loose skins are subsequently removed by other apparatus. The vegetables do not fill the steamer and are tumbled as they move along the conveying screw to loosen the skins without substantial cooking of the flesh.

Lewis U.S. Pat. No. 3,135,190, June 2, 1964, employs a screw conveyor cooking tube 11 which is horizontally disposed and is connected in parallel with a water heating tube 10. Steam heated hot cooking water is maintained at a level at or near the top of the cooking tube and flows therealong with the product, being propelled by a conveying screw. At the discharge end of the cooking tube the water is bypassed into the water heating tube wherein the water is heated by steam and re-enters the cooking tube at the food entrance end thereof. The cooking tube discharges the cooked product directly from the cooking tube onto an upwardly running mesh conveyor in a tank 15 which is part of the hot water circulating system. The system operates at near atmospheric pressure. The steam injection nozzle system assists in circulating the cooking water through the main tubes 11 and 10.

Altman U.S. Pat. No. 3,252,406, May 24, 1966, discloses a grain cooking system wherein a temporary overriding air pressure is admitted by a pipe 77 into a rotary "trap" or valve 42 as well as by a pipe 73 at the discharge end to prevent the escape of steam, which is the cooking medium, in a screw conveyor pressure cooker 10. Steam is supplied to the cooker by lower and side nozzle manifolds 59. The grain is fed into the cooker through two series-connected valves, the feed screw delivers the cooked grain through a discharge valve into a screw compressor 28 wherein the compressed grain is air cooled. The air pressure can be shut off once the unit is in operation and additional moisture can be added during cooking through a valved pipe 61.

Hickey et al U.S. Pat. No. 3,263,592, Aug. 2, 1966, discloses a process for rendering animal fats to product tallow and a meal for animal food and increases the protein content of the meal by spraying stickwater from a fat decanter through nozzles 43 into a steam heated screw conveyor rendering cooker.

Altman, U.S. Pat. No. Re. 26,474, Oct. 8, 1968, is similar to Altman U.S. Pat. No. 3,252,406 but operates with a single input valve, which air under pressure is applied to the feeder valve to assist in retaining steam under pressure in the cooker.

SUMMARY OF THE INVENTION

The present invention is especially useful for cooking or sterilizing foods which are eventually canned along with sauce, such as pinto beans, tomatoes, etc. An important feature of the invention is that of using the sauce itself as the cooking medium for the patentable product in a continuous cooker, instead of relying solely upon the use of live steam in the cooker. In the preferred embodiment of the invention, the sauce, with which a particulate food product is eventually packed, is heated to a cooking or sterilizing temperature in a heat exchanger and is circulated through a continuous cooker, such as a valved screw conveyor cooker, to which the particulate product is introduced through an inlet valve. The circulating sauce (heated to a sterilizing temperature) serves as the product cooking medium and the product is simultaneously flavored, sterilized and cooked in the horizontally oriented continuous pressure cooker or "steamer" which also has an outlet valve. The cooker is substantially completely full of canning sauce heated to a sterilizing temperature and the particulate product. In order to prevent flashing during cooking, the cooking process is conducted under pressure by the injection of superheated steam or steam under pressure into the cooker. These gases occupy the relatively small space in the cooker above the sauce level and if steam is employed as the pressurizing gas, reliance is not placed on the steam as a direct cooking medium. Sauce is pumped out of the cooker free of the product, is heated in the heat exchanger and the heated sauce is re-introduced into the cooker.

The flashing problem upon discharge is not as serious in an all sauce cooking process but it is present and is readily solved. In order to prevent flashing upon discharge, some of the sauce discharged with the cooked product is separated out and cooled. The cooled sauce is pumped into the product discharge passage upstream of the rotary outlet valve of the cooker so as to cool the discharged product in a pressure environment before the product is released to atmosphere. This sauce cooling step cools the product below the atmospheric boiling point of the cooking sauce and thus prevents flashing of the product upon its discharge to atmosphere. Thus the particulate product maintains its original uncooked shape and overall appearance when discharged to atmosphere.

The use of sauce instead of water as the cooling medium does not dilute the product with water and hence maintains the cooked product flavor, which has already been enhanced by penetration of the sauce into the product during the cooking process. The cooked and sauce-impregnated product may then be directly sealed in cans or jars with added hot sauce which drained from the cooked product at discharge but is collected and reheated. With some products, cool water instead of cooled sauce may be injected into the cooked product at a rotary discharge valve to achieve the pressure cooling step, but water is only employed for cooling the product where the resultant dilution of the cooking sauce does not impair the flavor and aroma of the product in comparison to the use of sauce for cooling the same product.

BRIEF DESCRIPTION OF THE DRAWINGS

FIG. 1 is a schematic diagram section, partly in elevation, of a continuous pressure cooking system according to the present invention.

FIG. 2 is a schematic vertical section illustrating a modified embodiment of a rotary pressure discharge valve which may be used in a water cooling system.

DESCRIPTION OF THE PREFERRED EMBODIMENTS

FIG. 1 shows a continuous pressure sterilizer or cooker 10 which includes a horizontal cylindrical shell 12 and a helical conveying screw 14 supported on a shaft 16 driven by a conventional variable speed drive unit (not shown). Mounted in the shell 12, at the product inlet end of shaft 16, is a disc-like rotary screen 18 to screen product from a sauce drain pipe and a conical rotary screen 20 is mounted on the product discharge end of the shaft 16 to prevent product from being drawn out with a sauce drain pipe at that end of the cooker.

At the inlet end of the pressure cooker 10 is a large product inlet conduit 22 which communicates with the interior of the shell 12 and receives particulate product from a driven rotary inlet valve 24, which valve is of a known construction, such as that disclosed in the aforementioned Wilbur U.S. Pat. No. 2,534,648.

The inlet valve 24 has a generally cylindrical, closed end shell 26 with a driven internal rotor 28 formed to cooperatively define, with the shell 26, moving pockets 30 which advance incoming product in the direction of the arrow 31. As each pocket 30 reaches an upper position, it is filled with particulate food product P by any suitable feed system, such as a feed conveyor 32 and feed hopper 33. As mentioned and as will be later described, the cooker shell 12 is full of heated cooking sauce whereby the particles of food are simultaneously cooked, sterilized and impregnated with the sauce.

At the delivery end of the pressure cooker 10, a driven rotary outlet valve 34, including a shell 36 enclosing a driven rotor 38 having pockets 40 that receive cooked product and some sauce from an outlet conduit 42, the pockets moving in the direction of the arrow 43. The cooked product, entrained in liquid cooking sauce, is discharged from the lower end of the valve 34 through an outlet port 44 into a collecting hopper 45. Running through opposed slots in the walls of the collecting hopper is the upper reach of a screen mesh discharge conveyor 46. Thus sauce S that drains through the conveyor 46 is collected at the bottom of the collecting hopper 45 while the upper reach of the screen mesh conveyor 46 carries the cooked particulate product and some sauce onto a belt conveyor 48 for delivery to a conventional downstream canning station, not shown.

As earlier mentioned, the particulate product discharged from the pressure cooker 10 is impregnated with hot sterile cooking space under super-atmospheric pressure at a temperature above 212° C. and is completely sterilized and cooked. However, to avoid flashing, both the product and sauce are discharged to atmosphere from the pressure cooker at a temperature below 212° F. (100° C.), by steps to be described presently. The product from the conveyor 48 is delivered to a can filler and is canned under sterile conditions by aseptic canning processes known in the art. After the cooking process of the present invention, the particulates are interiorly sterile, and any subsequent sterilizing step required during canning the product can be of short duration because the cooked particulates have been heated throughout their bulk and no prolonged subsequent sterilization step is required to insure sterilization of the inside of the particles. Due to the fact that the particulates and sauce must be correctly proportioned when filled into cans, cooking sauce S from the sauce collecting hopper 45 is transferred by a conduit 50 to a sauce sump 52. If desired, a sterile gas may be circulated in the head space of the sump by lines 52a,52b. Part of the sauce in the sump 52 is delivered by a conduit 53 to a pump 54 which directs the sauce to a conventional sterile canning machine or the like which includes a filler and a lidder, not shown.

The shell 12 is normally filled with sauces and particulate product and this mixture rises to the level 54 in the inlet conduit 22. In order to provide super atmospheric pressure within the shell 12 during cooking, sterile air or superheated steam are admitted to the inlet 22 above the sauce level through a conduit 56. The override pressure is regulated in the conventional manner so that the cooking sauce can be heated to a cooking temperature that is higher than the atmospheric boiling temperature, the temperature being selected in accordance with the nature of the product and its residence time in the shell 12. The speed of the rotary valves 24,34, and the speed of the helical screw 14 are regulated so that the residence time for the product in the cooker shell plus the temperature selected for cooking, will result in the optimum cooking process for the specific food being processed.

Since sauce is drained at the collecting hopper 45, make up sauce must be added to maintain the sauce level 54. For this purpose, a sauce makeup line 57, which is masked by the rotating screen 18, supplies the desired volume of sauce initially and adds makeup sauce as required from a pump 58 having an inlet line 59, to compensate for the sauce that is discharged with the product as previously described. This makeup sauce in inlet line 59 is preferably preheated in a conventional heat exchanger (not shown) and its flow is controlled by automatic regulating means (not shown) such as a float at the sauce level 54.

The cooker shell 12 is kept completely full of cooking sauce at all times, but in order to make up for heat loss from the sauce to the incoming product, sauce is withdrawn from the cooker, re-heated and re-introduced.

In order to circulate and re-heat the sauce, sauce in the left hand portion of the cooker is positively withdrawn from the left end of shell 12 in a direction counter to the direction of sauce flow induced by the helical screw 14 in the shell 12. The admission of solids to the withdrawal pipe 60 is prevented by any suitable solids excluder such as the screen 18 and the pipe 60 directs sauce to the inlet of a sauce circulation pump 62 driven by a motor M. The pump outlet line 64 connects via a branch line 65, to a heat exchanger 66 having an internal sauce heating line 67. The line 67 is enclosed in a chamber through which live steam is circulated by lines 68,69.

The sauce in the right hand portion of the pressure cooker shell 12 is withdrawn in the same direction of the flow induced by the helical screw 14 by means including a sauce withdrawal line 70, which is screened by the rotary screen 20 and leads to the inlet of a circulation pump 72 driven by a motor M1. The outlet line 74 of pump 72 also conducts sauce to the heat exchanger 66 via the common branch line 65. Heated sauce in the heat exchanger line 67 is pressurized by the pumps 62 and 72 to a pressure that exceeds the vapor pressure in the shell 12. Heated sauce under pressure leaves the heat exchanger through a line 76 and supplies a sauce distribution manifold 78. Connected to the manifold 78 are multiple tubular hot sauce injection pipes 80 which have open nozzles 82 communicating with the interior of the shell 12. It is preferred that the direction of the streams sauce emitted from the nozzles 82 is contrary to the circumferential flow of sauce which is induced by rotation of the helical screw 14. This action, assures an efficient diffusion of the heated sauce and together with the outlet lines 60 and 70, which create a longitudinal flow of sauce in opposite directions toward the ends of the shell 12, maintain a substantially equal temperature distribution in the shell 12.

When the cooked food particles eventually reach the discharge end of the shell 12 and drop into the upper end of the outlet conduit 42, the temperature of the product is well above the flashing temperature, and it cannot be released to atmosphere without explosion or flash damage to the particles and excessive evaporative loss of sauce. To eliminate flashing, the temperature of the produce, while the product is still at the cooking pressure, its temperature is practically instantaneously reduced in the outlet conduit 42 by introducing cool cooking sauce. The cool sauce is provided by drawing off part of the sauce from the lower end of the sauce sump 52 by means of a conduit 84 and a sauce pump 86. The sauce in conduit 84, which has already partially cooled, is forced by the pump 86 through a water-cooled heat exchanger 88, the jacket of which receives cooling water from a line 89. Cooled sauce under pressure leaves the heat exchanger 88 via conduit 90, which injects the cooled sauce into the outlet conduit 42 at a point above the rotary discharge valve 34. Since the specific heat of the recirculated and cooled sauce injected into the outlet conduit 42 is not less than but equal to the specific heat of the heated sauce therein, and since both are liquids that intermix, the heat exchange between the hot and cool sauce streams is rapid, and a substantially equalibrium temperature of the combined sauces in the outlet conduit 42 is attained rapidly. Also, since the food particles or chunks have absorbed hot liquid sauce, the absorbed sauce is also rapidly cooled by the cool sauce. However, the thermal conductivity of the solid cellular material making up the food chunks or particles is much less than that of the sauce, and hence the sauce can attain an equilibrium temperature in so short a time that the interior of the particle solids will remain at a somewhat higher temperature than the temperature of the liquids in the mixture, although all temperatures are lowered below the liquid boiling point to prevent flashing of the product. Thus, the temperature of the mixed product entering the outlet conduit 42 may be in the order of 220° F. (104.4° C.) and cool sauce pumped through line 90 into the conduit 42 may be at about 110° F. (43° C.) resulting in a mean temperature of about 190° F. (88° C.) of the liquid in the product discharged by conduit 44 from the rotary outlet valve 34. Although the temperature of the interior of the product may be as high as 212° F. (100° C.) this temperature is low enough to prevent flashing of the particulate product when the mixture is discharged to the atmosphere for filling the product into containers.

Also, since there need be no large temperature difference between the cooling sauce in line 90 and the hot sauce mixed with the product in discharge conduit 42, large quantities of heat need not be extracted from the sauce in the heat exchanger 88 (e.g. cooled from 190° F. to 110° F.) before the cooled sauce is injected into the outlet conduit 42.

If the elapsed time of product transfer between discharge from the cooler and the canning and lidding of the cooked product is short, and since the temperature of the canning sauce from the line 53 need only be lowered to about 190° F., the partially cooled sauce and the cooked product can be rapidly sterilized at the filler (not shown) by conventional apparatus and methods.

EXAMPLE

In a precooking process for baked beans, the sauce is heated to 260° F. (127° C.) in the heat exchanger 66 and is then flashed into the cooker shell 12 from the nozzles 82.

Presoaked beans were added through the inlet valve 24 at a rate of 30 pounds (13.6 Kg) per hour. In order to maintain the sauce discharge (Brix scale) at about 20 percent, about 3–5 pounds (1.36–2.27 Kg) of water was added every 10 minutes to the product mixture in the cooker shell.

MODIFIED FORM

The operating conditions for a test run were as follows: The product was raw Michigan pea beans which had been pre-soaked in water at 70° F. (21° C.) for 30 minutes. The feed or inlet valve 24 was operated continuously at 4 revolutions per minute, and the helical conveying screw 14 at ½ revolutions per minute resulting in a residence time in shell 12 of about 20 minutes. The discharge or outlet valve 34 was operated at ½ revolution per minute for only 10–12 seconds for each minute, which resulted in the valve pockets being relatively full, and having a bean to sauce ratio of 1:1. About 80–90 percent of the cooker shell 12 capacity was occupied by the cooking sauce, which was a sugar solution of about 20 Brix scale density (1.0832 glucum), recirculated by the pumps 62 and 72 at about 2–2.5 gallons (7.57–9.46 liters) per minute and introduced in the sauce makeup conduit 58 at about 0.1 (0.38 liters) gallons per minute. The cooker shell 12 was held at a pressure of 15 p.s.i. (1.055 Kg/sq.cm, and a cooking temperature of about 250° F. (121° C.) was obtained by heating the sauce in the heat exchanger 66.

FIG. 2 illustrates a modified form wherein the sauce in the product mixture being discharged is cooled by water instead of by hot sauce. The modified rotary outlet valve 34a has connected thereto a water line 90a whereby cool water under pressure is introduced directly into the valve shell 36a and fills valve pockets approaching the product discharge conduit 42. The temperature and flow rate of the water in line 90a are controlled by known heat exchanger and pump controls so that the result and mixture of particulate product, sauce and water was cooled to about 190° F. before the valve rotor 38a discharged the mixture to the hopper 45. This process would be employed in cooking vegetables wherein the addition of water to the sauce is acceptable, as in the case of tomatoes.

Although the best mode contemplated for carrying out the present invention has been herein shown and described, it will be apparent that modification and variation may be made without departing from what is regarded to be the subject matter of the invention as defined in the appended claims.

What I claim is:

1. A food processing method comprising the steps of substantially filling a vessel through a pressure sealing valve with a mass of particulate raw food product such as beans, tomatoes, etc., creating a pressure environment in the vessel that is above atmospheric pressure, heating a canning sauce for the product externally of the vessel to a temperature above 100° C., cooking the mass in the vessel by circulating the externally heated sauce into and out of the vessel and through the mass; discharging the mixture of hot sauce and cooked product through a pressure sealing valve to the atmosphere; cooling a body of canning sauce, cooling the mixture while still under pressure and just before discharge by pumping the cooled canning sauce into the mixture of heated canning sauce and entrained cooked product under pressure to bring the temperature of the combined sauces low enough to cool the particulate product to a temperature which will prevent flashing at atmospheric pressure; and discharging the cooled sauce and the cooled, cooked entrained product therein from the pressure environment to atmosphere.

2. A method of continuously pressure cooking particulate food products such as beans, tomatoes, etc. directly to a stage ready for canning, comprising the steps of heating canning sauce to a product cooking temperature above 100° C., introducing the heated canning sauce into a vessel at super-atmospheric pressure; continuously introducing the food products into said vessel through a sealing valve and mixing the food products with said heated sauce; continuously agitating and advancing the mixture of sauce and food products along the vessel to cook the product directly in the heated sauce before the mixture reaches a pressurized product and sauce discharge zone; continuously withdrawing sauce from the vessel, reheating it, and pumping it back to the vessel under pressure and into the mixture for maintaining the confined body of sauce and product at said product cooking temperature; cooling a cooling liquid, combining the cooling liquid with the mixture of hot sauce and cooked product at said discharge zone and while the mixture is still at super-atmospheric pressure to reduce the temperature of the cooked product sufficiently to prevent flashing of the product at atmospheric pressure, and continuously discharging the cooled cooked food product and the cooled sauce mixture to atmosphere.

3. The method of claim 2, wherein said cooling liquid is obtained by draining sauce from the discharged mixture, cooling the sauce, and pumping it under pressure into said pressurized mixture discharge zone.

4. The method of claim 2, comprising the steps of storing a body of sauce drained from said discharged mixture, utilizing a portion of the stored sauce for said sauce cooling step, and directing another portion of said stored sauce for subsequent use in a product canning process.

5. The method of claim 2, wherein said mixture of sauce and product is confined in and moved along a vessel formed as an elongate pressure chamber, said sauce being withdrawn from opposite end portions of said chamber.

6. The method of claim 2, comprising the step of reheating said withdrawn sauce by circulating it through a conduit that is exposed to a fluid heating medium.

7. The method of claim 4, comprising the step of adding makeup sauce to the sauce in the vessel to compensate for the sauce that is directed for use in the canning process.

8. The method of claim 2, comprising the step of introducing a sterile gas under super-atmospheric pressure at a zone above the level of said body of stored sauce for maintaining the cooling sauce in its sterilized condition.

* * * * *